US009810211B2

(12) United States Patent
    Davidian et al.

(10) Patent No.: US 9,810,211 B2
(45) Date of Patent: Nov. 7, 2017

(54) LIQUID SUPPLY SYSTEMS

(71) Applicant: Zebra Skimmers Corp., Solon, OH (US)

(72) Inventors: Steven Davidian, Chagrin Falls, OH (US); William M. Burkey, Cleveland, OH (US)

(73) Assignee: ZEBRA SKIMMERS CORP., Solon, OH (US)

( * ) Notice: Subject to any disclaimer, the term of this patent is extended or adjusted under 35 U.S.C. 154(b) by 143 days.

(21) Appl. No.: 14/840,480

(22) Filed: Aug. 31, 2015

(65) Prior Publication Data

US 2016/0062371 A1    Mar. 3, 2016

Related U.S. Application Data

(60) Provisional application No. 62/045,150, filed on Sep. 3, 2014.

(51) Int. Cl.
    *G05D 11/13*     (2006.01)
    *F04B 43/12*     (2006.01)
    (Continued)

(52) U.S. Cl.
    CPC ............. *F04B 43/12* (2013.01); *F04B 13/00* (2013.01); *F04B 23/02* (2013.01); *F04B 49/06* (2013.01);
    (Continued)

(58) Field of Classification Search
    CPC .......... F04B 43/12; F04B 13/00; F04B 23/02; F04B 49/06; G05D 11/138; Y10T 137/85594
    See application file for complete search history.

(56) References Cited

U.S. PATENT DOCUMENTS 2,653,517 A * 9/1953 Pigott ..................... B24B 55/02
                                                  239/126
3,750,847 A   8/1973 Sluhan
              (Continued)

FOREIGN PATENT DOCUMENTS

EP    0 006 925 B1    2/1982
EP    0 550 991 A1    7/1993
                 (Continued)

OTHER PUBLICATIONS

International Search Report and Written Opinion for Corresponding Application No. PCT/US20151047714; dated Dec. 10, 2015.

*Primary Examiner* — Craig Schneider
*Assistant Examiner* — Kevin Barss
(74) *Attorney, Agent, or Firm* — Pearne & Gordon LLP

(57) ABSTRACT

Processes of and apparatus for supplying to an operation a liquid that is applied at the operation comprise delivering to the operation from a holding vessel a liquid of a prescribed composition comprising more than one constituent, whereby a spent liquid having a composition different from the prescribed composition can be formed at the operation. The spent liquid is returned to the holding vessel for redelivery to the operation. The composition of the liquid at the holding vessel can be continuously analyzed and the amount of each constituent of the liquid required to be added to the liquid at the holding vessel to provide a liquid of the prescribed composition determined and that amount of each constituent delivered to the holding vessel. A plurality of operations and respective holding vessels can be involved. The operations can comprise metalworking operations and the liquid of a prescribed composition can comprise a coolant.

37 Claims, 4 Drawing Sheets

(51) Int. Cl.
  *F04B 13/00* (2006.01)
  *F04B 23/02* (2006.01)
  *F04B 49/06* (2006.01)

(52) U.S. Cl.
  CPC ..... *G05D 11/138* (2013.01); *Y10T 137/85954* (2015.04)

(56) References Cited

U.S. PATENT DOCUMENTS

| | | | |
|---|---|---|---|
| 3,897,335 A * | 7/1975 | Brandt | C10M 175/04 |
| | | | 210/167.31 |
| 4,655,940 A | 4/1987 | Harms | |
| 4,865,724 A | 9/1989 | Brandt et al. | |
| 5,224,051 A | 6/1993 | Johnson | |
| 5,244,586 A * | 9/1993 | Hawkins | B01D 36/02 |
| | | | 210/314 |
| 5,262,071 A | 11/1993 | Tuck | |
| 5,456,097 A | 10/1995 | Zakhary et al. | |
| 5,582,740 A * | 12/1996 | McEwen | B01D 33/073 |
| | | | 184/108 |
| 5,595,462 A * | 1/1997 | Hensley | B23Q 1/0036 |
| | | | 408/1 R |
| 5,948,244 A * | 9/1999 | Fortier | B01D 17/0205 |
| | | | 210/167.01 |
| 6,322,694 B1 * | 11/2001 | Iliadis | B01D 17/0208 |
| | | | 210/167.01 |
| 6,343,610 B1 | 2/2002 | Berger et al. | |
| 6,460,549 B2 * | 10/2002 | Berger | B01D 21/2461 |
| | | | 134/186 |
| 6,860,142 B2 | 3/2005 | Seevers et al. | |
| 6,861,851 B2 | 3/2005 | Lvovich et al. | |
| 7,172,689 B2 | 2/2007 | Bratten | |
| 7,275,420 B2 * | 10/2007 | Discenzo | G01N 33/2888 |
| | | | 73/290 R |
| 7,305,897 B2 * | 12/2007 | Trapp | G01N 1/286 |
| | | | 73/864.41 |
| 7,338,606 B2 | 3/2008 | Bratten | |
| 8,894,852 B2 | 11/2014 | Urban | |
| 9,315,407 B2 * | 4/2016 | Urban | C02F 9/00 |
| 2007/0202603 A1 * | 8/2007 | Counts | G01N 1/14 |
| | | | 436/43 |
| 2010/0133292 A1 * | 6/2010 | Ware | B67D 7/0261 |
| | | | 222/1 |

FOREIGN PATENT DOCUMENTS

| | | |
|---|---|---|
| EP | 0 963 810 | 12/1999 |
| KR | 10-2012-0069060 A | 6/2012 |

\* cited by examiner

LIQUID SUPPLY SYSTEMS

CROSS-REFERENCE TO RELATED APPLICATION

This application claims the benefit of the filing date of Provisional Application Ser. No. 62/045,150 which was filed on Sep. 3, 2014 and which, by this reference thereto, is incorporated herein in its entirety for all purposes.

BACKGROUND OF THE INVENTION

Field of the Invention

This invention relates generally to a system for supplying a liquid of a prescribed composition to an operation at which the liquid is applied and is thereafter returned to the source of the liquid for further application to the operation following the effecting of any adjustments to the composition of the liquid at the source required to provide at the source the liquid of the prescribed composition. In particular, the invention relates to systems for supplying such liquids from a plurality of sources to a plurality of operations.

Discussion of the Prior Art

A variety of operations, such as are carried out in industrial settings, for example, call for systems for supplying to the operations liquids that are applied at the operations. A system of this type can include equipment for and methods of preparing a liquid according to a prescribed composition, as may be required at the operation, and delivering the liquid to the operation as needed. After application at the operation, the liquid is returned to its source and thereafter reapplied at the operation. An example of such an operation is a metalworking operation. The metalworking operation can involve, for example: metal fabricating, such as stamping for example; machining, such as milling for example; and lapping, polishing or grinding. Metalworking liquids that are delivered to the interface between a work piece and a metalworking tool at these operations are important to the effective performance of the operations. The metalworking liquids can be variously referred to, for example, as coolants, lubricants or cutting liquids.

Various types of metalworking liquids can be used in such operations. For example, straight oils, soluble, or emulsifiable oils, semi-synthetic liquids or synthetic liquids can be employed. The metalworking liquids can perform a variety of functions. For example, the metalworking liquids can: cool the work piece and the metalworking tool to keep the metalworking tool temperature down to prevent premature wear and damage of the metalworking tool and to keep the work piece temperature down to prevent warping of the work piece or the establishment of inaccurate dimensions in the work piece; provide a good finish on the work piece; and wash away fines, chips and swarfs from the work piece and the metalworking tool. The metalworking liquids can include additives such as, for example, additives for maintaining pH stability, corrosion inhibitors and biocides.

In many instances, a metalworking liquid after having been applied at a metalworking operation, and thereafter removed from the metalworking operation to the source of the metalworking liquid, is subsequently reapplied at the metalworking operation. As these metalworking liquids perform their functions at the metalworking operations, they can become contaminated by waste oils, referred to as "tramp oils," which can come, for example, from hydraulic liquids, way oils, lubricating oils, tapping oils and gear box oils at the metalworking machines used in the metalworking operations. In addition, the overall quality of the metalworking liquids can degrade in one fashion or another through use. Consequently, before these metalworking liquids can be reapplied at the metalworking operations, and in order to extend the useful life of the metalworking liquids, contaminants such as fines, chips, swarf and tramp oils are removed from the metalworking liquids on a continuous basis or by a batch process. The cleaning of the metalworking liquids can be carried out using, for example, filtration or separation techniques, and belt or disc skimmers. At the same time, the composition or make-up of the metalworking liquids following their application at the metalworking operations can require adjustment to their original prescribed compositions to correct for the degradation that has occurred or to alternate prescribed compositions. It is preferable that the metalworking liquid be returned to the metalworking operation only after the metalworking liquid has been cleaned and given a desired composition.

There is a need in the art to provide an efficient liquid supply system that can function in real time to continuously provide liquid of good quality and a desired composition to an operation at which the liquid is applied from a source of the liquid and after being applied is returned to the source for further application, i.e., recirculated, to the operation. The system should have the following attributes: the system should be capable of analyzing at a desired frequency the composition of the liquid as the liquid is continuously applied to the operation from the source of the liquid; based on the analysis that is made, the system should be able to determine the amounts of the constituents of the liquid that are to be added to the liquid at the source of the liquid to provide a liquid of the original prescribed composition or a desired modified prescribed composition; the system should be capable of adding to the liquid at the source of the liquid the amounts of liquid constituents of the liquids that have been determined must be added to provide at the source of the liquid a liquid of the prescribed composition; and the system should be capable of delivering the liquid of the prescribed composition to the operation. In one context, there is a need in the art to provide such an efficient system that can function in real time in connection with a metalworking operation in which a metalworking liquid is applied from a source of a metalworking liquid, such as sump for example, to a metal work piece and a metalworking tool and after which the spent metalworking liquid, the quality of which has typically degraded, is returned to the source of the metalworking liquid for further application to the metalworking operation. In particular, there is a need for such a system that can function with multiple metalworking operations and multiple metalworking machines.

BRIEF DESCRIPTION OF THE INVENTION

The following sets forth a simplified summary of selected aspects, embodiments and examples of the present invention for the purpose of providing a basic understanding of the invention. However, the summary does not constitute an extensive overview of all the aspects, embodiments and examples of the invention. Neither is the summary intended to identify critical aspects or delineate the scope of the invention. The sole purpose of the summary is to present selected aspects, embodiments and examples of the invention in a concise form as an introduction to the more detailed description of the aspects, embodiments and examples of the invention that follow the summary.

According to one aspect of the invention, a process of supplying to an operation a liquid that is applied at the operation comprises delivering to the operation from a holding vessel a liquid comprising more than one constituent and applying the liquid at the operation, whereby a spent liquid is formed and the spent liquid is returned to the holding vessel. In this and the other aspects of the invention, the process can include continuously delivering at the operation the liquid from the holding vessel and continuously returning the spent liquid from the operation to the holding vessel. While the liquid at the holding vessel is being delivered and applied at the operation and the spent liquid is being returned to the holding vessel, the composition of the liquid at the holding vessel is analyzed. In this and the other aspects of the invention, samples of the liquid in the holding vessel can be continuously removed from the holding vessel and the samples can be continuously analyzed. The process further involves determining the amount of each constituent of the liquid that is required to be added to the liquid at the holding vessel to provide at the holding vessel a liquid of a prescribed composition and delivering to a pressure vessel that amount of each constituent, thereby providing a constituent volley at the pressure vessel. The pressure in the pressure vessel is increased to a level adequate to deliver the constituent volley to the holding vessel upon the release of the pressure and thereafter the pressure at the pressure vessel is released so as to cause the pressure at the pressure vessel to forcibly deliver the constituent volley to the holding vessel. In this and all the other aspects of the invention, the operations can comprise metalworking operations at which the holding vessel comprises a sump and the liquid of a prescribed composition can comprise a coolant that includes a coolant concentrate and water. Also, in this and all other aspects of the invention, the process can be applied at a plurality of operations wherein, each operation is associated with a respective holding vessel, a common pressure vessel is operatively associated with all the holding vessels and each constituent volley is delivered to a respective holding vessel for which the constituent volley has been provided at the pressure vessel. Where a plurality of operations and a plurality of holding vessels are involved, the samples removed from the holding vessels can be continuously, selectively and alternatively analyzed and continuously returned to the respective holding vessels from which the samples were removed.

According to another aspect, in the case of a plurality of operations and a plurality of respective holding vessels, each constituent volley provided is delivered from the pressure vessel to a distribution arrangement that directs each constituent volley to the respective holding vessel for which each constituent volley has been provided at the pressure vessel. In this and the other aspects of the invention, the volume of the liquid present at each holding vessel is continuously monitored and the determination of the amount of each constituent that is required to be added to the liquid at a respective holding vessel to provide at that holding vessel a liquid of a prescribed composition is based on the results of the analysis made of the composition of the liquid in that holding vessel and the determination made of the volume of the liquid present in that holding vessel.

According to a further aspect a process of supplying to each of a plurality of operations a liquid comprises continuously delivering to each operation from a holding vessel a liquid comprising more than one constituent, continuously applying at each operation the liquid delivered to that operation, whereby a spent liquid is continuously formed, continuously returning the spent liquid from each operation to the holding vessel from which the liquid forming that spent liquid was delivered and continuously removing from each holding vessel a sample of the liquid in that holding vessel. The process additionally includes continuously, selectively and alternately routing each sample of the liquid removed from each holding vessel to a common analytical device, analyzing at the common analytical device each sample of the liquid removed from each holding vessel as the samples are continuously routed to the analytical device. Following the analysis of a sample of the fluid at the analytical device, that sample of the fluid is returned from the analytical device to the holding vessel from which that sample of the fluid was removed. Also, each sample of a liquid removed from a holding vessel and not routed to the analytical device is continuously returned to the holding vessel from which the sample was removed. The amount of each constituent of a liquid that is required to be added in order to provide a liquid of a prescribed composition at a holding vessel from which a sample analyzed at the analytical device has been removed is determined and the amount of each constituent so determined is delivered to that holding vessel. In this aspect, a constituent volley is prepared comprising the amount of each constituent of a liquid that is required to be added in order to provide a liquid of a prescribed composition at the holding vessel from which a sample analyzed at the analytical device has been removed. The constituent volley is directed to a distribution arrangement at which the constituent volley is routed and delivered to the holding vessel for which the constituent volley is intended.

According to an additional aspect, a liquid supply system that is operatively associated with an operation is configured to supply to the operation a liquid of a prescribed composition, comprising a plurality of constituents. The liquid of a prescribed composition, following its application at the operation, comprises a spent liquid. The liquid supply system includes: a holding vessel that is operatively associated with the operation and from which the liquid of a prescribed composition is delivered to the operation and to which the spent liquid from the operation is returned; an analytical device that is configured to analyze the composition of the liquid in the holding vessel; a sampling arrangement that is operatively associated with the holding vessel and with the analytical device and is configured to obtain from the holding vessel and deliver to the analytical device liquid from the holding vessel; a pressure vessel that is operatively associated with the holding vessel; a respective constituent supply arrangement that is operatively associated with a source of each of the plurality of constituents and with the pressure vessel and is configured to deliver to the pressure vessel a quantity of constituent required to provide at the holding vessel the liquid of a prescribed composition, whereby a constituent can be delivered to the pressure vessel by each respective constituent supply arrangement to provide a constituent volley at the pressure vessel; a pneumatic pressuring source that is operatively associated with the pressure vessel and is configured to increase the pressure in the pressure vessel to a selected value while the constituent volley is maintained in the pressure vessel; and a constituent volley delivery arrangement that is operatively associated with the pressure vessel and the holding vessel and is configured to maintain the constituent volley in the pressure vessel while the pressure in the pressure vessel is being increased by the pneumatic pressuring source, release the constituent volley from the pressure vessel when the pressure in the pressure vessel reaches the selected value and deliver the constituent volley to the holding vessel pursuant to the impetus of the selected pressure established in the pressure vessel by the pneumatic pressuring device.

According to yet another aspect, the constituent volley delivery arrangement of the liquid supply system includes a constituent volley conduit system that is operatively associated with the pressure vessel and the holding vessel and is configured to convey the constituent volley to the holding vessel from the pressure vessel. A pressure control valve is operatively associated with the constituent volley conduit system and is configured to selectively close the constituent volley conduit system to the conveyance of the constituent volley to the holding vessel from the pressure vessel when the pressure in the pressure vessel is being increased to the selected value. The pressure control valve also is configured to open the constituent volley conduit system to the conveyance of the constituent volley to the holding vessel from the pressure vessel when the selected pressure in the pressure vessel is reached, whereby the constituent volley is delivered to the holding vessel through the constituent volley conduit system.

According to yet a further aspect in which the liquid supply system is operatively associated with a plurality of operations, a respective holding vessel is operatively associated with each operation and a respective sampling arrangement is operatively associated with each respective holding vessel. The sampling arrangement includes a sample delivery arrangement and a sample routing unit. Each delivery arrangement is configured to continuously obtain from the holding vessel and deliver to the sample routing unit the liquid from the holding vessel, and each sample routing unit is operatively associated with a sample return arrangement and with the analytical device and is configured to selectively route to either the sample return arrangement or the analytical device liquid delivered to the sample routing unit by the sample delivery arrangement. The constituent volley delivery arrangement is operatively associated with each holding vessel and includes a distribution arrangement from which the constituent volley from the pressure vessel is delivered to the holding vessel for which the constituent volley is intended. The distribution arrangement can include a constituent volley valve that is located in the constituent volley conduit system.

According to yet an additional aspect, each sample routing unit comprises a respective two-way valve to which the liquid from a sample delivery arrangement is delivered. Each two-way valve has a first exit port and a second exit port that are selectively opened and closed. The first exit port is configured when open to be in liquid communication with the analytical device, and the second exit port when open is configured to be in liquid communication with the sample return arrangement, whereby when the first exit port is open the second exit port is closed, the liquid from the sample delivery arrangement that is delivered to the respective two-way valve is delivered to the analytical device and thereafter to the sample return arrangement through an analytical device discharge line for the return of the liquid to the holding vessel from which the liquid has been removed. When the second exit port is open, the first exit port is closed, and the liquid from the sample delivery arrangement that is delivered to the respective two-way valve flows through a respective second exit port discharge line operatively associated with the sample return arrangement for the return of the liquid to the holding vessel from which the liquid has been obtained.

According to still another aspect, each sample return arrangement includes a liquid return valve that is operatively associated with the analytical device discharge line and a liquid return line that is operatively associated with a holding vessel. The liquid return valve is configured to selectively open to the flow of liquid from the analytical device discharge line to the respective liquid return line only when the liquid from the analytical device discharge line comprises liquid removed from the holding vessel, and the respective second exit port discharge line is in liquid communication with liquid return line.

According to still a further aspect, each sample delivery arrangement includes a sampling line that is operatively associated with the liquid in a holding vessel and with a sample routing unit. Each sample delivery arrangement includes a peristaltic pump that is configured to withdraw liquid from the respective holding vessel and deliver the liquid to the sample routing unit through the sampling line.

According to still an additional aspect, a liquid diffuser is located in each holding vessel and is operatively associated with an open end of a sampling line located in the holding vessel, whereby liquid enters the open end of the sampling line through the diffuser. The constituent volley conduit system also is operatively associated with the diffuser so as to convey a constituent volley from the constituent volley conduit system to the holding vessel through the diffuser.

According to another aspect, a liquid supply system is operatively associated with a plurality of operations and is configured to supply to each operation a liquid of a prescribed composition comprising a plurality of constituents. The respective liquid of a prescribed composition, following its application at a respective operation, comprises a spent liquid. The liquid supply system includes: a holding vessel that is operatively associated with each operation and from which a liquid of a prescribed composition is delivered to the operation and to which a spent liquid from the operation is returned; an analytical device that is configured to analyze the composition of the liquid in each holding vessel; a sampling arrangement that is operatively associated with each holding vessel and with a sample return arrangement, both of which are operatively associated with the analytical device, each sampling arrangement being configured to continuously obtain from a holding vessel and selectively route to either a sample return arrangement or the analytical device the liquid obtained from a holding vessel, and the analytical device being configured to deliver to the sample return arrangement liquid routed to the analytical device from the sampling arrangement; a constituent supply arrangement that is operatively associated with a source of each of the plurality of constituents and configured to provide a constituent volley comprising the quantity of each constituent required to provide at each holding vessel the liquid of a prescribed composition; and a constituent volley delivery arrangement that is operatively associated with the constituent supply arrangement and with each holding vessel and including a distribution arrangement from which a constituent volley is delivered to a holding vessel for which the constituent volley is intended.

According to a further aspect, the sampling arrangement includes a sample delivery arrangement and a sample routing unit. The sample delivery arrangement is configured to continuously obtain from the holding vessel and deliver to the sample routing unit the liquid from the holding vessel. Each sample routing unit is operatively associated with a sample return arrangement and with the analytical device and is configured to selectively route to either the sample return arrangement or the analytical device liquid delivered to the sample routing system by the sample delivery arrangement.

According to an additional aspect, the distribution arrangement includes a plurality of constituent volley valves. Each constituent volley valve is operatively associated with a holding vessel through a constituent volley conduit system and is configured to open when a constituent volley is intended for the holding vessel with which the constituent volley valve is operatively associated.

BRIEF DESCRIPTION OF THE DRAWINGS

The foregoing and other aspects, embodiments, examples, modes, types and kinds of the present invention will be apparent to those skilled in the art to which the present invention relates based on the detailed descriptions that follow with reference to the accompanying drawings, wherein the same reference numerals are used in the several figures to refer to the same parts, elements and components and in which.

DETAILED DESCRIPTION

Aspects, embodiments, and examples of the present invention are described below with references, in certain respects, to the accompanying drawings. These aspects, embodiments and examples are not intended to be limitations on the present invention. Thus, in some instances, one or more examples of the present invention described with reference to one aspect or embodiment can be utilized in other aspects and embodiments. In addition, certain terminology is used herein for convenience only and is not to be taken as limiting the present invention.

Figure 1:
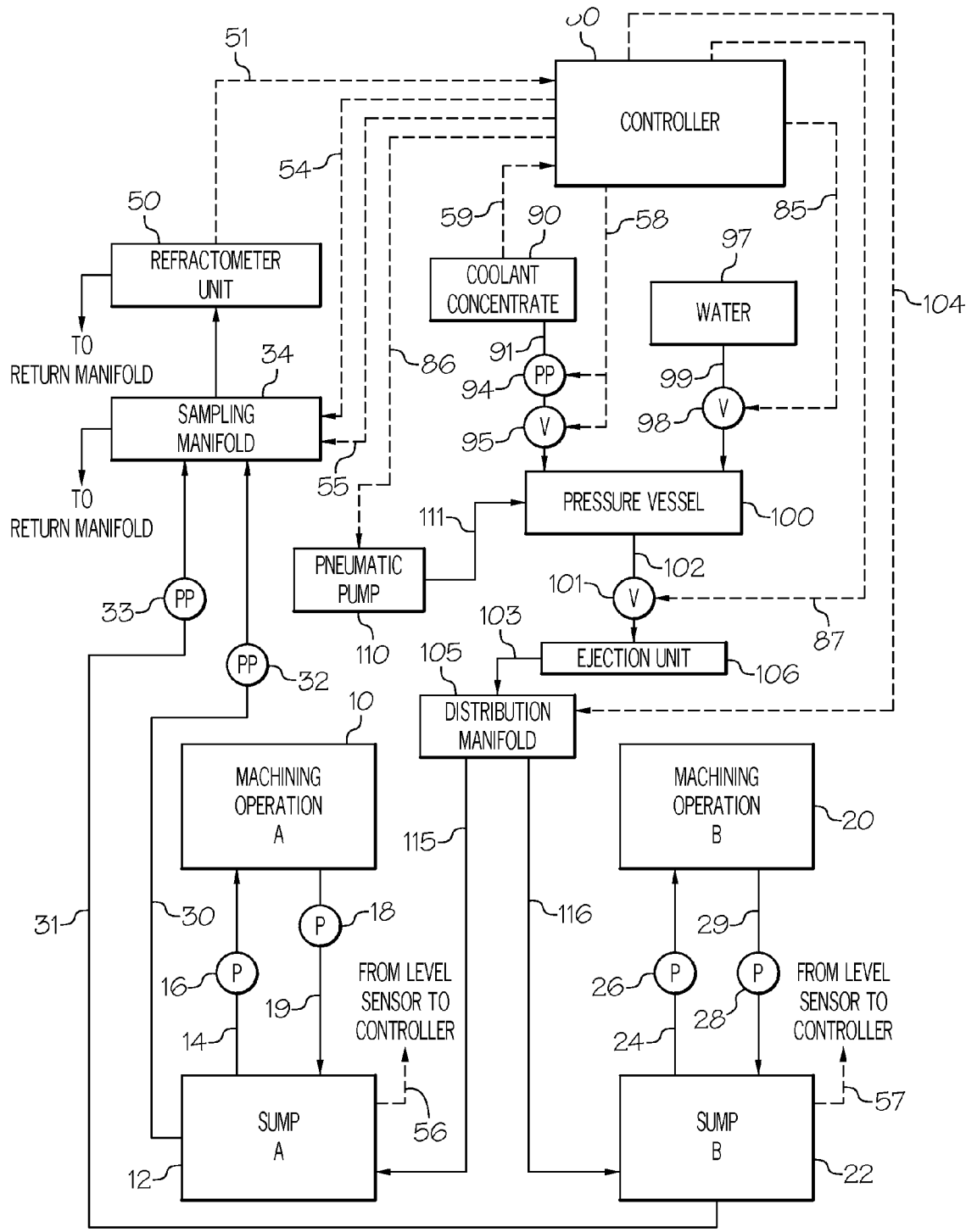
FIG. 1 is a flowchart that illustrates diagrammatically the general construct of a liquid supply system designed in accordance with an example of an embodiment of the invention and indicates the operational relationships that are present between and among components of the liquid supply system.

Referring first to FIG. 1, there is illustrated a liquid supply system that is operatively associated with an operation and configured to supply to the operation a liquid of a prescribed composition comprising a plurality of constituents. In the example of the invention illustrated in FIG. 1, the operation comprises a machining operation and the liquid of a prescribed composition comprises a cooling liquid the constituents of which are a coolant concentrate and water. The liquid supply system of the present invention can be operatively associated with only one or with a plurality of operations, and can be particularly beneficially applied at a facility at which a large number of operations are essentially concurrently conducted.

In all the figures of the drawings, the solid lines between components of the liquid supply system indicate liquid conductors, such as conduits, tubing and piping for example, through which a liquid flows and the dashed lines between components of the liquid supply system indicate transmission lines through which electrical and/or electronic signals or impulses are transmitted. In certain instances familiar to those having ordinary skill in the art, rather than providing transmission lines between components, wireless signals may be employed between components.

In the example of FIG. 1, the liquid supply system of the invention is shown as being applied to two operations, each of which comprises a machining operation. A first machining operation is identified in FIG. 1 as "Machining Operation A," i.e., a first machining operation 10, and a second machining operation is identified in FIG. 1 as "Machining Operation B," i.e., a second machining operation 20. The first machining operation 10 and the second machining operation 20 can comprise operations at which a work piece is machined by a cutting tool such as a rotary cutter in a milling operation for example. However, the present invention is not limited to metal cutting operations but can be applied, for example, to operations involving lapping, polishing or grinding of metal parts. Also, the present invention can be applied to metal fabricating operations such as stamping operations for example. Further, the present invention is not limited to being applied to metal working operations and can be employed in operations conducted on other materials such as plastics for example. Thus, the invention can be employed generally at an operation at which an article is being worked and a liquid of a prescribed composition is required to be supplied to the work site, removed and returned from the operation to the source of the liquid and thereafter reapplied to the operation.

In FIG. 1, with respect to the first machining operation 10, liquid of a prescribed composition can be contained in a holding vessel such as "Sump A," i.e., a first sump 12 and a first holding vessel, and can be delivered to the first machining operation 10 from the first sump 12 through a first prescribed liquid supply line 14 by a first liquid supply pump 16 in the first prescribed liquid supply line 14. Similarly, with respect to the second machining operation 20, liquid of a prescribed composition can be contained in a holding vessel such as "Sump B," i.e., a second sump 22 and a second holding vessel, and can be delivered to second machining operation 20 from the second sump 22 through a second prescribed liquid supply line 24 by a second liquid supply pump 26 in thesecond prescribed liquid supply line 24. Each of the first sump 12 and the second sump 22 thus comprises a respective holding vessel operatively associated with a respective operation.

The liquids of a prescribed composition can be supplied to the work pieces and the working tools at the first machining operation 10 and the second machining operation 20 by flooding, spraying or misting methods, for example, and can comprise, for example, a water-based coolant such as a water-soluble oil, for example, that can both cool and lubricate the work piece and the working tools. In the example illustrated in the drawings, the water-based coolant comprises a coolant concentrate that is diluted with water in a particular ratio of coolant to water to provide a liquid of a prescribed composition that is provided in the first sump 12 and the second sump 22.

The water-based coolants of a prescribed composition that are contained in the first sump 12 and the second sump 22 can have the same prescribed compositions or different prescribed compositions as may be required or desired in consideration of the particular operations that are conducted at the first machining operation 10 and the second machining operation 20. The water-based coolant in addition to including coolant concentrate and water can include additions such as, for example, biocides that inhibit the formation of bacterial or fungal populations that naturally tend to grow in the coolant over time, corrosion inhibitors that are added to protect the machines employed at the machining operations and pH stabilizers for the water-based coolant.

The water-based coolants of a prescribed composition following their application at the first machining operation 10 and the second machining operation 20 comprise spent liquids that are returned to the first sump 12 and the second sump 22, respectively. Specifically, the spent liquid from the first machining operation 10 is returned by a first spent fluid return pump 18 to the first sump 12 through a first spent fluid conduit 19, and the spent liquid from the second machining operation 20 is returned by a second spent fluid return pump 28 to the second sump 22 through a second spent fluid conduit 29. Thus, each of the first sump 12 and the second sump 22 comprises a holding vessel that is operatively associated with an operation comprising the first machining operation 10 and the second machining operation 20, respectively, from which a liquid of a prescribed composition, comprising the water-based coolant in the example of the drawings, is delivered to the operation and to which the spent liquid, comprising the spent water-based coolant, is sent from the operation.

The delivery of the water-based coolant of a prescribed composition to the machining operations from the sumps and the return of spent water-based coolant to the sumps can take place continuously. At the same time, the water-based coolant of a prescribed composition can become contaminated at the machining operations. A common type of contamination that occurs is the formation of tramp oils in the water-based coolant. The tramp oils can comprise, for example, lubricating oils that can seep out from the metalworking equipment, hydraulic oil leaks from the equipment and oils that coat the as-delivered work pieces to the machining operation.

To address the contamination, the spent water-based coolant before being returned to the first sump 12 and the second sump 22 can be directed to equipment for filtering out from the spent water-based coolant any solids such as metal cuttings and to equipment such as coalescers for removing the tramp oils. Alternatively, disc or belt skimmers can be provided separately from or at the sumps for removing tramp oils.

The liquid of a prescribed composition (in the example shown in the drawings, the water-base coolant) also can degrade to an altered composition as it is applied at the machining operations and becomes spent. The degradation can result, for example, in the case of a water-based coolant as a result of the evaporation of the water contained in the water-based coolant. Consequently, the spent liquid returned to each of the first sump 12 and the second sump 22 can have a composition that is different from the original composition of the liquid delivered to the machining operation through the first prescribed liquid supply line 14 and the second prescribed liquid supply line 24, respectively. Therefore, the compositions of the liquids in the sumps tend to be altered by the spent liquids as the liquids are continuously delivered to the machining operations from the sumps and spent liquids are continuously returned to the sumps from the machining operations. Further, it may be that there is a need or desire to change the compositions of the liquids being delivered to the machining operations. In either case, it will be necessary to add to the liquids in the sumps constituents of those liquids in amounts so as to provide in each sump a liquid of a prescribed composition. In the case of the example of the invention shown in the drawings, in which a water-based coolant is contained in each of the sumps, the water-based coolant includes constituents of water and coolant concentrate in amounts so as to provide in each of the sumps water-based coolant of a prescribed composition.

For the purpose of determining the amounts of constituents that must be added to the water-based coolant in each sump in order to provide in the sump water-based coolant of a prescribed composition, the values of two variables must be identified. First, the relative amounts of water and coolant concentrate in the liquid in the sump must be determined and, second, the total volume of the liquid in the sump must be known.

To determine the relative amounts of water and coolant concentrate in the liquid in the sump, i.e., the concentration of the coolant concentrate in the sump, an analytical device configured to analyze the composition of the liquid in the sump is provided. As used herein, the term "analytical device" is intended to include, not only a device that is capable of analyzing a liquid to determine a single constituent or property possessed by the liquid composition, but also, arrangements at which more than a single constituent or property of the liquid is analytically determined. Such arrangements can comprise, for example, a single analytical device that is capable of analyzing a liquid for more than a single constituent or property, sometimes referred to as a "total analysis system," and arrangements wherein more than one analytical device is provided to analyze the liquid for more than one constituent or property.

In the example of the invention shown in FIG. 1, the analytical device comprises a refractometer unit 50. The information developed at the refractometer unit 50 is transmitted to a controller 80 through a first transmission line 51. The controller can comprise, for example, a general purpose computer programmed to perform the functions hereafter described for it or a special purpose computer constructed to perform those functions.

For the purpose of determining the concentration of the coolant concentrate in the coolant, a refractometer is adequate. However, where the liquid supply system of the invention is employed to deal as well with other constituents in the liquid delivered to the machining operations, other types of analytical devices, such as conductivity and pH monitors, for example, can be provided and the information developed by those analytical devices transmitted to the controller 80 through appropriate transmission lines. As indicated above, the analytical devices can be capable of analyzing for a single or multiple properties of a liquid and can comprise more than one analytical device.

A respective sampling arrangement is operatively associated with each sump and with the refractometer unit 50 and is configured to obtain from the sump and deliver to the refractometer unit 50 liquid from the sump. In the example of the invention shown in FIG. 1, each sampling arrangement includes a sample delivery arrangement and a sample routing unit, both described in detail below. The sample delivery arrangement is configured to continuously withdraw, obtain or remove from a respective sump and deliver to a respective sample routing unit the liquid from the respective sump.

A first sample delivery arrangement operatively associated with the first sump 12 includes a first sampling line 30 that is operatively associated with the liquid in the first sump 12, and can comprise flexible tubing, for example, and a first peristaltic pump 32 for withdrawing liquid from the first sump 12 and delivering the liquid through the first sampling line 30 to a first sample routing unit that is located at a sampling manifold 34 and is described below. A second sample delivery arrangement operatively associated with the second sump 22 includes a second sampling line 31 that can comprise flexible tubing, for example, and is operatively associated with the liquid in the second sump 22 and a second peristaltic pump 33 for withdrawing liquid from the second sump 22 and delivering the liquid through the second sampling line 31 to a second sample routing unit also located at sampling manifold 34 and described below.

Figure 2:
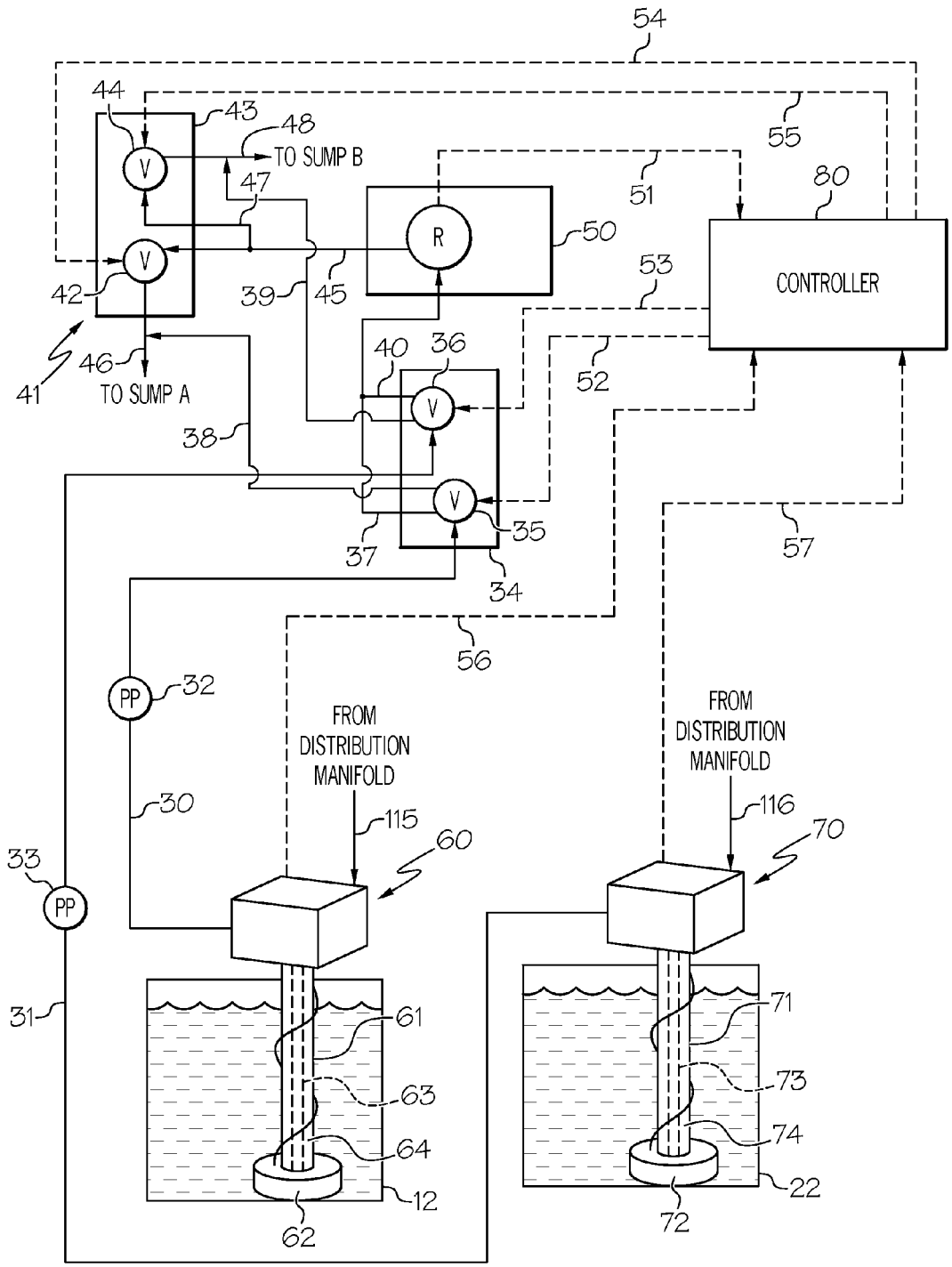
FIG. 2 is a flowchart that illustrates diagrammatically in greater detail the construct of a first subassembly of selected components of the example of the liquid supply system of FIG. 1 and indicates the operational relationships between and among the components of that first subassembly.

Referring now to FIG. 2, there is shown a first sump probe, indicated generally at 60, located at the first sump 12. One function of the first sump probe 60 can be to support the first sampling line 30 such as by coiling the first sampling line 30 about the first sump probe body 61 as shown in FIG. 2. The first sump probe 60 also includes a first liquid diffuser 62 that is attached at the bottom of the first sump probe body 61 and is operatively associated with an open end of the first sampling line 30 such that the open end terminates at the first liquid diffuser 62, whereby liquid from the first sump 12 enters the open end of the first sampling line 30 through the first liquid diffuser 62 pursuant to the action of the first peristaltic pump 32 and continues on to the first sample routing unit. The first liquid diffuser 62 can comprise a porous material that provides a base by means of which the first sump probe 60 is supported at the bottom of the first sump 12. The first liquid diffuser 62 is sufficiently porous to allow liquid in the first sump 12 to be readily drawn into the first sampling line 30.

Also shown in FIG. 2 is a second sump probe indicated generally at 70. Similar to the first sump probe 60, a function of the second sump probe 70 can be to support the second sampling line 31 such as by coiling the second sampling line 31 about the second sump probe body 71 as shown in FIG. 2. The second sump probe 70 also includes a second liquid diffuser 72 that is attached at the bottom of the second sump probe body 71 and into which an open end of the second sampling line 31 terminates, whereby liquid from the second sump 22 enters the open end of the second sampling line 31 through the second liquid diffuser 72 and continues on to the second sample routing unit pursuant to the action of the second peristaltic pump 33. The second liquid diffuser 72 also can comprise a porous material that provides a base by means of which the second sump probe 70 is supported at the bottom of the second sump 22.

In the example of the invention illustrated in the drawings, as shown particularly in FIG. 2, the first sample routing unit includes a first two-way valve 35 located at the sampling manifold 34 and operatively associated with the first sampling line 30 of the first sample delivery arrangement for the delivery of liquid from the first sump 12. The second sample routing unit includes a second two-way valve 36 located at the sampling manifold 34 and operatively associated with the second sampling line 31 of the second sample delivery arrangement for the delivery of liquid from second sump 22.

The first two-way valve 35 includes a first exit port and a second exit port that are selectively opened and closed so that when one exit port is open the other exit port is closed. The first exit port of first two-way valve 35, when open, is in liquid communication with the refractometer unit 50 through a first two-way valve first routing line 37, and the second exit port of the first two-way valve 35, when open, is in liquid communication with a sample return arrangement, indicated generally at 41 in FIG. 2 and described below, through a first two-way valve second routing line 38. The operation of the first two-way valve 35 is controlled by the controller 80 through a second transmission line 52 so as to either open the first exit port of the first two-way valve 35 and place the first exit port in liquid communication with the refractometer unit 50 through the first two-way valve first routing line 37 or open the second exit port of the first two-way valve 35 and place the second exit port in liquid communication with the sample return arrangement 41 through the first two-way valve second routing line 38.

Also as shown in FIG. 2, the second two-way valve 36 includes a first exit port and a second exit port that are selectively opened and closed so that when one exit port is open, the other exit port is closed. The first exit port of the second two-way valve 36, when open, is in liquid communication with the refractometer unit 50 through a second two-way valve first routing line 40 that is connected to the first two-way valve first routing line 37, and the second exit port of the second two-way valve 36, when open, is in liquid communication with the sample return arrangement 41 through a second two-way valve second routing line 39. The operation of the second two-way valve 36 is controlled by the controller 80 through a third transmission line 53 so as to either open the first exit port of the second two-way valve 36 and place the first exit port in liquid communication with the refractometer unit 50 through the second two-way valve first routing line 40 or open the second exit port of the second two-way valve 36 and place the second exit port in liquid communication with the sample return arrangement 41 through the second two-way valve second routing line 39.

With respect to the first two-way valve 35, when the first exit port is open, the second exit port is closed and the liquid from the first sampling line 30 of the first sample delivery arrangement that is delivered to the first two-way valve 35 is delivered to the refractometer unit 50 and thereafter to the sample return arrangement 41 through a refractometer discharge line 45 for the return of the liquid to the first sump 12 from which the liquid has been obtained. When the second exit port is open, the first exit port is closed and the liquid from the first sampling line 30 of the first sample delivery arrangement that is delivered to the first two-way valve 35 flows through a first two-way valve second routing line 38 operatively associated with the sample return arrangement 41 for the return of the liquid to the first sump 12 from which the liquid has been obtained.

With respect to the second two-way valve 36, when the first exit port is open, the second exit port is closed and the liquid from the second sampling line 31 of the second sample delivery arrangement that is delivered to the second two-way valve 36 is delivered to the refractometer unit 50 and thereafter to the sample return arrangement 41 through the refractometer discharge line 45 for the return of the liquid to the second sump 22 from which the liquid has been obtained. When the second exit port is open, the first exit port is closed and the liquid from the second sampling line 31 of the second sample delivery arrangement that is delivered to the second two-way valve 36 flows through a first two-way valve second routing line 38 operatively associated with the sample return arrangement 41 for the return of the liquid to the second sump 22 from which the liquid has been obtained.

From the foregoing description, it can be seen that each sample routing unit is operatively associated with a sample return arrangement and with an analytical device; and each sample routing unit is configured to selectively route to either the sample return arrangement or the analytical device liquid delivered to the sample routing unit by the sample delivery arrangement Turning now to a description of the sample return arrangement 41 as best seen in FIG. 2, included at the sample return arrangement 41 is a return manifold 43 at which are located a first liquid return valve 42 and a second liquid return valve 44. The first liquid return valve 42 is operatively associated with the refractometer unit 50 and the first sump 12 through a first liquid return line 46, and the second liquid return valve 44 is operatively associated with the refractometer unit 50 and the second sump 22 through the second liquid return line 48. Specifically, the first liquid return valve 42, when open, is in liquid communication with the refractometer unit 50 through the refractometer discharge line 45 and with the first sump 12 through the first liquid return line 46. The second liquid return valve 44, when open, is in liquid communication with the refractometer unit 50 through the refractometer discharge line 45 and a refractometer auxiliary discharge line 47 and with the second sump 22 through the second liquid return line 48. The controller 80 controls the first liquid return valve 42 by means of a fourth transmission line 54 to be either opened or closed to the passage of liquid from the refractometer discharge line 45 through the first liquid return valve 42 to the first liquid return line 46. The controller 80 additionally controls the second liquid return valve 44 by means of a fifth transmission line 55 to be either open or closed to the passage of liquid from the refractometer discharge line 45 and the refractometer auxiliary discharge line 47 through the second liquid return valve 44 to the second liquid return line 48 and the refractometer auxiliary discharge line 47.

Based on the foregoing descriptions, it will be understood that liquids from both the first sump 12 and the second sump 22 are continuously extracted from the sumps and delivered to the first two-way valve 35 and the second two-way valve 36, respectively. When the liquid in the first sump 12 is to be analyzed, controller 80, by means of the second transmission line 52, will cause the first exit port of the first two-way valve 35 to open and the second exit port of the first two-way valve 35 to close. At the same time, the controller 80, by means of a third transmission line 53 will cause the first exit port of the second two-way valve 36 to close and the second exit port of the second two-way valve 36 to open. Also at the same time, the controller 80, by means of the fourth transmission line 54, will cause the first liquid return valve 42 to open and by means of the fifth transmission line 55 will cause the second liquid return valve 44 to close. As a result, the liquid delivered to the first sampling line 30 and the first two-way valve 35 from first sump 12 is delivered to the refractometer unit 50 through the first two-way valve first routing line 37 and thereafter passes through the refractometer discharge line 45, through the first liquid return valve 42 and through the first liquid return line 46 to the first sump 12. Concurrently, liquid from the second sump 22 passing through the second sampling line 31 is delivered to the second two-way valve 36 where the liquid is routed through the second two-way valve second routing line 39 to the second liquid return line 48 and to the second sump 22, as a result of the second two-way valve second routing line 39 being in liquid communication with the second liquid return line 48.

Alternatively, when the liquid in the second sump 22 is to be analyzed, the controller 80 by means of the second transmission line 52 will cause the first exit port of the second two-way valve 36 to open and the second exit port of the second two-way valve 36 to close. At the same time, the controller 80, by means of the second transmission line 52, will cause the first exit port of the first two-way valve 35 to close and the second exit port of the first two-way valve 35 to open. Also at the same time, the controller 80, by means of the fourth transmission line 54 will cause the first liquid return valve 42 to close and by means of the fifth transmission line 55 will cause the second liquid return valve 44 to open. As a result, the liquid delivered to the second sampling line 31 and the second two-way valve 36 from the second sump 22 is delivered to the refractometer unit 50 through the second two-way valve first routing line 40 and the first two-way valve first routing line 37 and thereafter passes through the refractometer discharge line 45 and through the refractometer auxiliary discharge line 47 and the second liquid return valve 44 to the second liquid return line 48. From the second liquid return line 48, the liquid returns to the second sump 22. Concurrently, liquid from the first sump 12 passing through the first sampling line 30 to the first two-way valve 35 passes through the first two-way valve second routing line 38 to first liquid return line 46 as a result of the first two-way valve second routing line 38 being in liquid communication with the first liquid return line 46. From the first liquid return line 46, the liquid is returned to the first sump 12.

Thus, the first liquid return valve 42 is configured to selectively open to the flow of liquid from the refractometer discharge line 45 only when that liquid comprises liquid removed from the first sump 12. Similarly, the second liquid return valve 44 is configured to selectively open to the flow of liquid from the refractometer discharge line 45 only when that liquid comprises liquid removed from the second sump 22.

The controller 80 is programed so that a liquid sample from the first sump 12 only or the second sump 22 only is delivered to the refractometer unit 50 from the sampling manifold 34 at any one time while the liquid obtained from the other sump is returned to that other sump. The precise manner in which the liquids from the sumps, or in the case in which more than two sumps are involved, the manner in which the liquids from that plurality of sumps, is selectively and separately analyzed can vary. Thus, for example, the liquids can be analyzed seriatim one sump after another until the liquid from each sump has been analyzed and the sequence repeated. If there is a reason to do so, liquids from certain sumps may be analyzed with a greater or lesser frequency than the liquids from the other sumps. In any event, in order that real time information concerning the quality of the liquids in all the sumps be available, liquids from all the sumps are continuously obtained from the sumps and delivered to respective two-way valves at the sampling manifold 34 where the respective liquids in their turn can be delivered to the refractometer unit 50 or returned to the respective sumps from which they were obtained as directed by the controller 80.

Once a liquid from a particular sump is analyzed, the information is delivered from the refractometer unit 50 to the controller 80 through the first transmission line 51. As noted above, in order that the appropriate amounts of constituents are delivered to a particular sump to provide liquid in the sump at a prescribed composition, both the existing composition of the liquid as well as the volume of the liquid present in the sump must be known. In order to determine that volume, as shown in FIG. 2, the first sump probe 60 includes a first liquid level sensor 63, and the second sump probe 70 includes a second liquid level sensor 73 for determining the level of the liquid in first sump 12 and the second sump 22, respectively, and providing that information to the controller 80 through a sixth transmission line 56 and a seventh transmission line 57, respectively. The controller 80 is programmed so as to be able to relate liquid levels in the sumps to the respective volumes of the liquids in the sumps. Therefore, with that volume information and the compositional information provided by the refractometer unit 50, the controller 80 is able to calculate the volumes of the respective constituents that need to be added to a particular sump to provide liquid in the sump at the prescribed composition.

Figure 4:
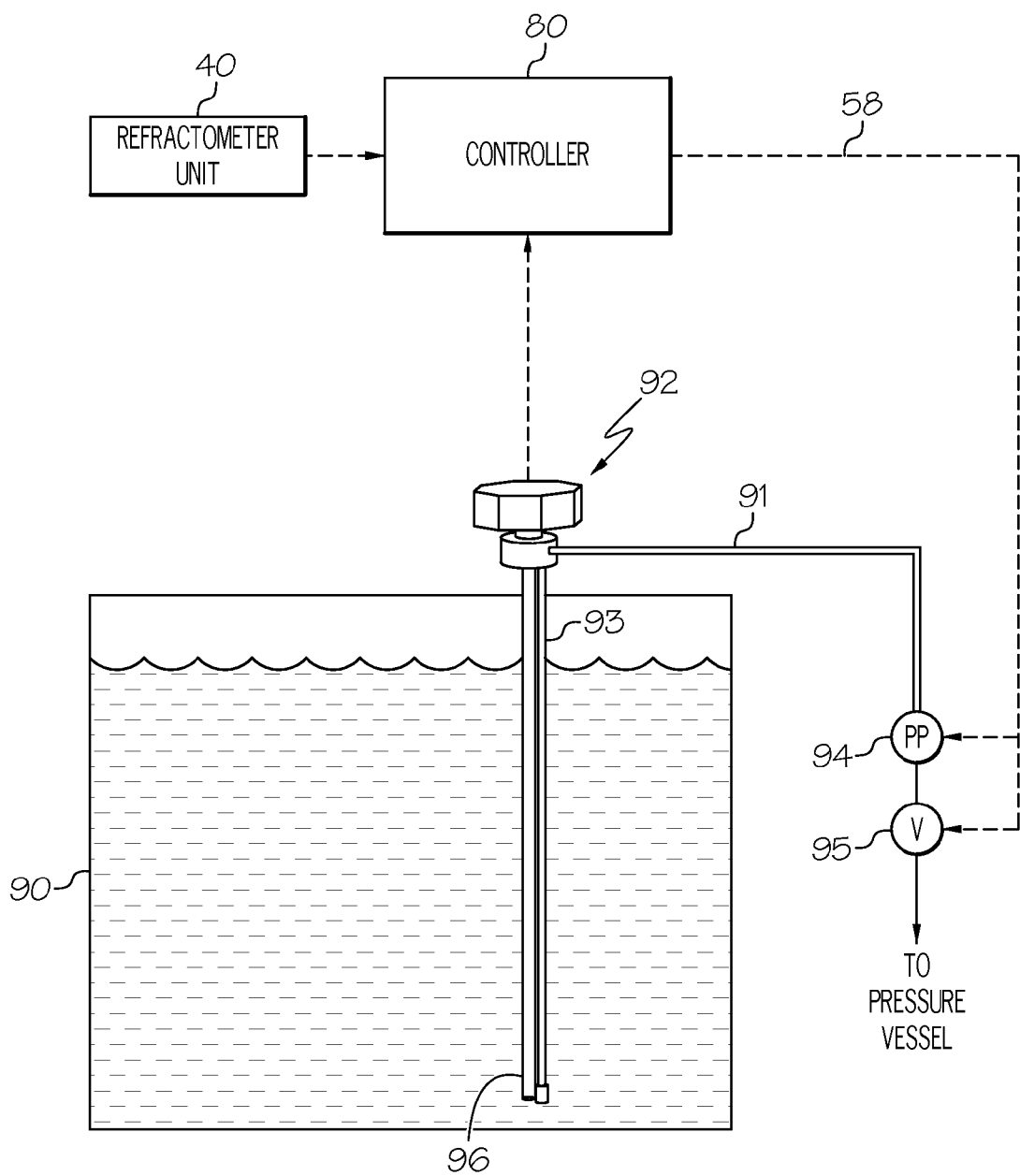
FIG. 4 is a flowchart that diagrammatically illustrates in greater detail the construct of a third subassembly of selected components of the example of the liquid supply system of FIG. and indicates the operational relationships between and among the components of that third subassembly.

As noted above, in the example of the invention illustrated in the drawings, the liquids in the sumps that are delivered to the machining operations include two constituents, a coolant concentrate and water, although, as also indicated above, the invention encompasses liquids that include more than two constituents. Accordingly, as shown in FIGS. 1 and 4, a container 90 is provided in which the cooling concentrate is held. The container 90 is operably associated with a pressure vessel 100 to which the coolant concentrate in the container 90 is delivered through coolant concentrate delivery line 91; and the pressure vessel 100 is operatively associated with the sumps for the delivery to the sumps constituents of the coolant as described below. As can be seen in FIG. 4, a coolant concentrate probe, indicated generally at 92, is situated in container 90 and includes an extraction line 93 through which coolant concentrate is delivered to the coolant concentrate delivery line 91.

A coolant concentrate peristaltic pump 94 and a coolant concentrate valve 95 are included at coolant concentrate delivery line 91. An eighth transmission line 58 is operatively associated with the controller 80 and both the coolant concentrate peristaltic pump 94 and the coolant concentrate valve 95. At such time as a determination is made at the controller 80 of the volume of coolant concentrate that is to be delivered to the pressure vessel 100, the controller 80 through the eighth transmission line 58 activates the coolant concentrate peristaltic pump 94 and causes the coolant concentrate valve 95 to open. The controller 80 will have been programmed in a manner to relate the time that the coolant concentrate peristaltic pump 94 is in operation with the volume of the coolant concentrate that is extracted from the container 90. Consequently, the controller 80 will cause the coolant concentrate peristaltic pump 94 to remain in operation and the coolant concentrate valve 95 to remain open for the period of time required to extract from the container 90 coolant concentrate in the volume that has been determined at the controller is needed.

The coolant concentrate probe 92 also includes a coolant concentrate level sensor 96 that determines the level of the coolant concentrate in the container 90 and delivers the information to the controller 80 through a ninth transmission line 59. The purpose of monitoring the coolant concentrate level is to provide an alert when the volume of coolant concentrate in the container 90 becomes less than required. The alert can be provided by the controller 80 sending the information to a monitor, not shown, associated with the controller.

With respect to water additions required to be made as determined at the controller 80, a container holding water can be provided and the requisite volume of water added to the pressure vessel 100 in a manner as described above in respect of additions of the coolant concentrate. However, in the example of the invention shown in the drawings, a source of water 97 comprises a facility water system that is connected to the local water supply. The source of water 97 is operatively associated with the pressure vessel 100 through a water supply line 99 at which a water supply valve 98 is located. The water supply valve 98 is electrically operable and its operation is controlled by controller 80 through a tenth transmission line 85. The controller 80 will have been programmed to relate the volume of water that is delivered by the source of water 97 with time so that the controller 80 will maintain the water supply valve 98 open for the period of time necessary to allow water in the required amount to be delivered to the pressure vessel 100.

From the foregoing description, it will be understood that a respective constituent supply arrangement is provided that is operatively associated with a source of each of the plurality of constituents, i.e., the coolant concentrate at 90 and the water at 97, and with the pressure vessel 100. Each respective constituent supply arrangement is configured to deliver to the pressure vessel 100 a quantity of a respective constituent required to provide at a holding vessel the liquid of a prescribed composition.

The concentrate coolant and water delivered to the pressure vessel 100 by each respective constituent supply arrangement in the required amounts and held in the pressure vessel 100 comprises a constituent volley and the elements and components for supplying the constituent volley to a sump comprises a constituent volley delivery arrangement. The constituent volley delivery arrangement is operatively associated with the first sump 12 and the second sump 22 and includes a distribution arrangement, described below, from which a constituent volley from the pressure vessel 100 is delivered to a respective one of the sumps.

For the purpose of delivering the constituent volley to a sump, a pneumatic pressuring source, such as a pneumatic pressuring apparatus comprising a pneumatic pump 110, for example, is operatively associated with the pressure vessel 100 through a pressure line 111 by means of which the pressure in the pressure vessel 100 is increased to a selected value while the constituent volley is maintained in the pressure vessel 100. The controller 80 controls the operation of the pneumatic pump 110 through an eleventh transmission line 86 and activates the pneumatic pump 110 at such time as the constituent volley is completely contained within the pressure vessel 100. The level to which the pressure at the pressure vessel 100 is increased is dependent, at least in part, on the force required to deliver the constituent volley to an appropriate sump. The pneumatic pressuring source is not limited to a pneumatic pump per se, but can comprise other pneumatic pressuring sources such as, for example, an air supply system that is in place at the facility at which the machining operations are being performed.

Figure 3:
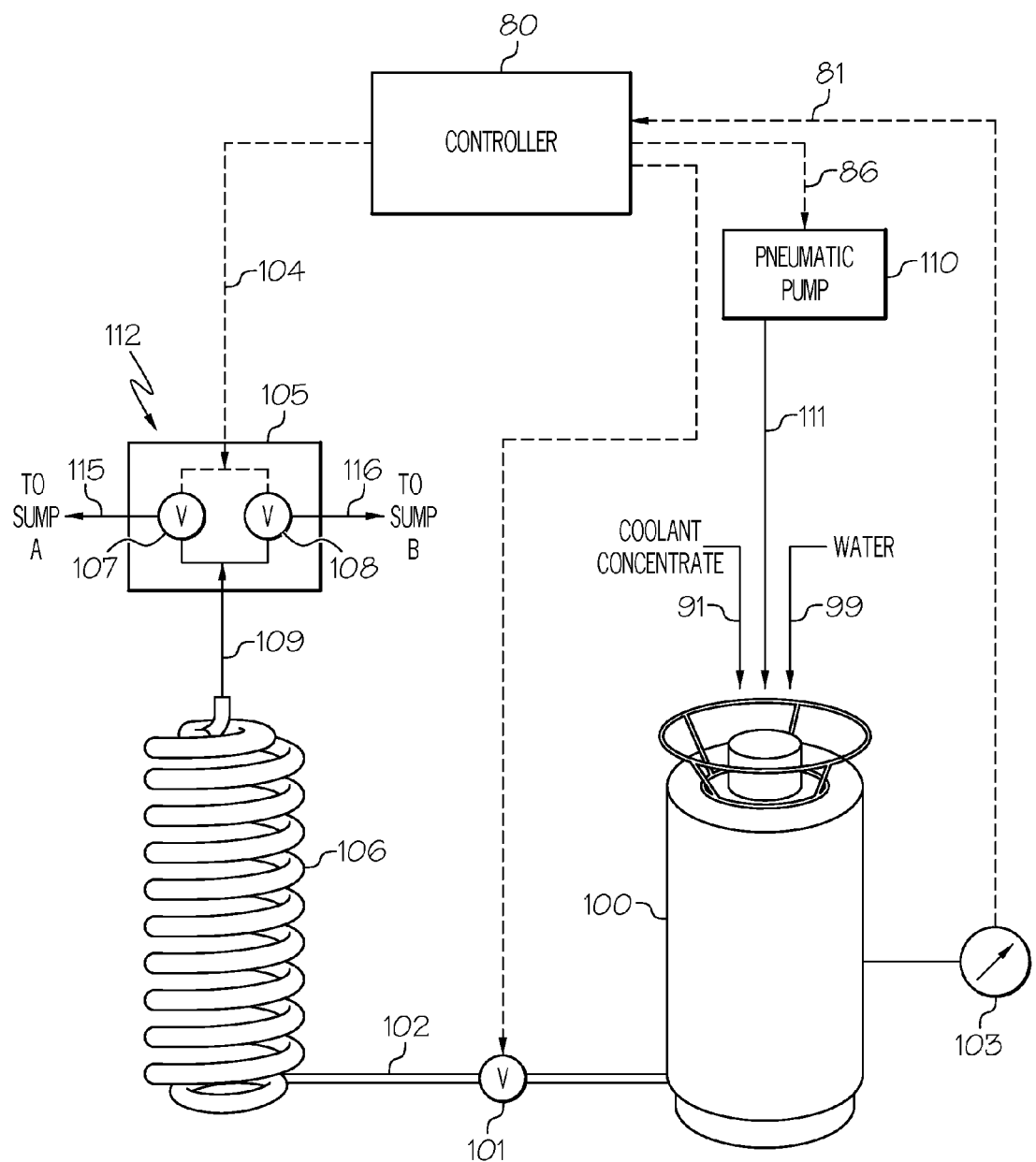
FIG. 3 is a flowchart that illustrates diagrammatically in greater detail the construct of a second subassembly of selected components of the example of the liquid supply system of FIG. 1 and indicates the operational relationships between and among the components of that second subassembly.

Referring to FIGS. 1 and 3, a pressure control valve 101 that is electrically controllable is located at a constituent volley delivery line 102 through which the constituent volley passes when released from the pressure vessel 100. The operation of the pressure control valve 101 is controlled by the controller 80 through a twelfth transmission line 87 in a manner such that when the pressure in the pressure vessel 100 is being increased by the pneumatic pump 110, the pressure control valve 101 is closed. At such time as the pressure in the pressure vessel 100 has reached the required level, the controller 80 through the twelfth transmission line 87 causes the pressure control valve 101 to open releasing the constituent volley from the pressure vessel 100 into the constituent volley delivery line 102 for delivery to the appropriate sump. A pressure gage 103 is operatively associated with the pressure vessel 100 to monitor the pressure in the pressure vessel 100 and provide the monitored information to the controller 80 through a thirteenth transmission line 81, whereby the controller 80 may open the pressure control valve 101 at the appropriate pressure.

In the example of the invention in which a single sump and machining operation is involved, the constituent volley delivery line 102 is operatively associated with the single sump, and the constituent volley proceeds directly to that sump under the impetus provided by the pressure established in the pressure vessel 100. In the case in which a plurality of sumps are involved, the constituent volley proceeds to a distribution arrangement, indicated generally at 112, that is a part of the constituent volley delivery arrangement and includes a distribution manifold 105 that includes components for routing the constituent volley to a particular sump from which the liquid has been sampled as controlled at the controller 80. In either case, the constituent volley can be directed from the pressure vessel 100 to an ejection unit 106 before passing on to the identified sump. As shown in FIG. 3, the ejection unit 106, which is optional, can comprise a spirally wound conduit that can enhance the mixing of the constituents of the constituent volley as the constituent volley passes through the ejection unit 106 and proceeds to the appropriate sump.

As can be seen in FIG. 3, the constituent volley after passing through the ejection unit 106, in those instances in which such a unit is provided, passes to the distribution manifold 105 through a constituent volley auxiliary delivery line 109 operatively associated with the ejection unit 106 and the distribution manifold 105. At the distribution manifold 105 there is present a first constituent volley valve 107 operatively associated with the pressure vessel 100 and the first sump 12 and configured to deliver to the first sump 12 through a first sump delivery line 115 constituent volleys intended for the first sump 12. Also at the distribution manifold 105 there is present a second constituent volley valve 108 operatively associated with the pressure vessel 100 and the second sump 22 and configured to deliver to the second sump 22 through a second sump delivery line 116 constituent volleys intended for the second sump 22.

The first constituent volley valve 107 and the second constituent volley valve 108 are electrically operable and are controlled for opening and closing by the controller 80 through a fourteenth transmission line 104. Thus, upon the opening of the pressure control valve 101 by the controller 80, either first constituent volley valve 107 or second constituent volley valve 108 is opened, depending for which of the first sump 12 and the second sump 22 the constituent volley released from the pressure vessel 100 by the opening of the pressure control valve 101 is intended. At the same time, the controller 80 causes the distribution valve associated with the sump that is not to receive the constituent volley to remain closed. In this manner, the constituent volley is delivered to the first sump 12 through the first sump delivery line 115 or to the second sump 22 through the second sump delivery line 116 as appropriate.

From the foregoing description, it will be understood that in an example of the present invention a constituent volley delivery arrangement is operatively associated with the pressure vessel 100 and is configured to (a) maintain the constituent volley in the pressure vessel while the pressure in the pressure vessel is being increased by the pneumatic pump 110, (b) release the constituent volley from the pressure vessel when the pressure in the pressure vessel reaches a selected value and (c) deliver the constituent volley to the appropriate sump pursuant to the impetus of the selected pressure established at the pressure vessel 100 by the pneumatic pump 110.

The constituent volley delivery arrangement includes a constituent volley conduit system comprising the elements and components that are located between the pressure vessel 100 and the sumps and is operatively associated with the pressure vessel 100 and the first sump 12 and the second sump 22 and is configured to convey each constituent volley to the sumps from the pressure vessel. The pressure control valve 101 is operatively associated with the constituent volley conduit system and is configured to selectively close the constituent volley conduit system to the conveyance of each constituent volley to a sump from the pressure vessel 100 when the pressure in the pressure vessel is being increased to the selected value and open the constituent volley conduit system to the conveyance of each constituent volley to a sump from the pressure vessel 100 when the selected pressure in the pressure vessel is reached, whereby each constituent volley is delivered to a sump through the constituent volley conduit system.

Turning to FIG. 2, it is there shown that the constituent volley proceeding through the first sump delivery line 115 is delivered to the first sump 12 through the first sump probe 60. Specifically, the constituent volley enters first sump probe 60 and proceeds down a first sump probe annulus 64 between the first sump probe body 61 and the first liquid level sensor 63. The first sump probe annulus 64 is in liquid communication with the first liquid diffuser 62 so that the constituent volley passes through the first liquid diffuser 62 before entering the first sump 12.

Similarly, as shown in FIG. 2, the constituent volley proceeding through second sump delivery line 116 is delivered to the second sump 22 through second sump probe 70. The constituent volley enters the second sump probe 70 and proceeds down a second sump probe annulus 74 between the second sump probe body 71 and the second liquid level sensor 73. The second sump probe annulus 74 is in liquid communication with the second liquid diffuser 72 so that the constituent volley passes through the second liquid diffuser 72 before entering the second sump 22. The diffusers contribute to the mixing of the constituent volley with the liquids in the sumps so as to facilitate the establishment of liquids of prescribed compositions in the sumps.

Thus, the constituent volley conduit system is operatively associated with the first liquid diffuser 62 in the first sump 12 so as to convey a constituent volley from the constituent volley conduit system to the first sump 12 through the first liquid diffuser 62. Similarly, the constituent volley conduit system is operatively associated with the second liquid diffuser 72 in the second sump 22 so as to convey a constituent volley from the constituent volley conduit system to the second sump 22 through the second liquid diffuser 72.

It will be understood that because liquid from a sump is continuously supplied to an associated machining operation and is continuously returned from the machining operation, the quality of the liquid being supplied can continuously vary. At the same time, however, liquid in the form of a constituent volley is furnished only from time to time to the sump. Consequently, the liquid in the sump cannot be maintained at a precise single-value composition. Therefore, the prescribed composition for the liquid delivered to the machining operation from the sump can comprise a composition range which allows for the fact that some variation in the composition of the liquid delivered to the associated machining operation is acceptable. The composition range can comprise a single value plus or minus specific allowances. The liquid supply system of the invention thus allows for constituent volleys to be delivered to the sump sufficiently frequently to provide the liquid in the sump within the composition range established for the sump.

While the present invention has been described above and illustrated with reference to certain examples and embodiments thereof, it is to be understood that the invention is not so limited. For example, as noted above, the invention can have application to liquid supply systems supplying a single sump or more than two sumps. In another variation, the controller can control the liquid supply pumps and the return pumps that are associated with the liquid supply lines and the liquid return conduits, respectively, that connect the sumps and the machining operations. In addition, modifications and variations of the aspects of the invention described herein will occur to those skilled in the art upon reading the present specification with reference to the associated drawings. The present invention is intended to cover and include any and all such modifications and variations that are encompassed by the following claims.

What is claimed is:

1. A process of supplying to an operation a liquid that is applied at the operation comprising:
   delivering to the operation from a holding vessel a liquid comprising more than one constituent;
   applying the liquid at the operation, whereby a spent liquid is formed;
   returning the spent liquid to the holding vessel;
   analyzing the composition of the liquid at the holding vessel while the liquid at the holding vessel is being delivered and applied at the operation and the spent liquid is being returned to the holding vessel;
   determining the amount of each constituent of the liquid that is required to be added to the liquid at the holding vessel to provide at the holding vessel a liquid of a prescribed composition;
   delivering to a pressure vessel the amount of each constituent that is required to be added to the liquid at the holding vessel so as to form at the pressure vessel a constituent volley that comprises a combination of each constituent that is required;
   increasing the pressure in the pressure vessel to a level adequate to deliver the constituent volley to the holding vessel upon the release of the pressure; and
   releasing the pressure from the pressure vessel so as to cause the pressure at the pressure vessel to forcibly deliver the constituent volley to the holding vessel.

2. The process of claim 1, including:
   continuously delivering at the operation the liquid from the holding vessel; and
   continuously returning the spent liquid from the operation to the holding vessel.

3. A process of supplying to an operation a liquid that is applied at the operation comprising:
   continuously delivering to the operation from a holding vessel a liquid comprising more than one constituent;
   applying the liquid at the operation, whereby a spent liquid is formed;
   continuously returning the spent liquid to the holding vessel;
   analyzing the composition of the liquid at the holding vessel while the liquid at the holding vessel is being delivered and applied at the operation and the spent liquid is being returned to the holding vessel;
   determining the amount of each constituent of the liquid that is required to be added to the liquid at the holding vessel to provide at the holding vessel a liquid of a prescribed composition;
   delivering to a pressure vessel the amount of each constituent that is required to be added to the liquid at the holding vessel, thereby providing a constituent volley at the pressure vessel;
   increasing the pressure in the pressure vessel to a level adequate to deliver the constituent volley to the holding vessel upon the release of the pressure; and
   releasing the pressure from the pressure vessel so as to cause the pressure at the pressure vessel to forcibly deliver the constituent volley to the holding vessel, wherein
   the process is applied at a plurality of operations, each operation is associated with a respective holding vessel, a common pressure vessel is operatively associated with all the holding vessels and each constituent volley is delivered to the respective holding vessel for which the constituent volley has been provided at the pressure vessel.

4. The process of claim 3 including:
   continuously removing from each holding vessel a sample of the liquid in the holding vessel;
   continuously, selectively and alternatively analyzing the sample of the liquid removed from each holding vessel; and
   continuously returning to each holding vessel the sample of the liquid removed from that holding vessel.

5. The process of claim 4 wherein each constituent volley is delivered from the pressure vessel to a distribution arrangement that directs each constituent volley to the respective holding vessel for which each constituent volley has been provided at the pressure vessel.

6. The process of claim 5 including continuously determining the volume of the liquid present at each holding vessel.

7. The process of claim 6 wherein, the determination of the amount of each constituent that is required to be added to the liquid at a respective holding vessel to provide at that holding vessel a liquid of a prescribed composition is based on the results of the analysis made of the composition of the liquid in that holding vessel and the determination made of the volume of the liquid present in that holding vessel.

8. The process of claim 7 wherein the operations comprise metalworking operations.

9. The process of claim 8 wherein the liquid of a prescribed composition comprises a coolant that includes a coolant concentrate and water.

10. A process of supplying to each of a plurality of operations a respective liquid, the process comprising:
    continuously delivering to each operation from a respective holding vessel a respective liquid comprising more than one constituent;
    continuously applying at each operation the respective liquid delivered to that operation, whereby a respective spent liquid is continuously formed;
    continuously returning the respective spent liquid from each operation to the respective holding vessel from which the respective liquid forming that respective spent liquid was delivered;
    continuously removing from each respective holding vessel a sample of the respective liquid in that holding vessel;
    continuously, selectively and alternately routing each sample of the respective liquid removed from each respective holding vessel to a common analytical device;
    analyzing at the common analytical device each sample of the respective liquid removed from each respective holding vessel as the samples are continuously routed to the analytical device;
    following the analysis of a sample of the respective fluid at the analytical device, returning that sample of the respective fluid from the analytical device to the respective holding vessel from which that sample of the respective fluid was removed;

continuously returning to a respective holding vessel each sample of a respective liquid removed from that respective holding vessel and not routed to the analytical device;

determining the amount of each constituent of a respective liquid that is required to be added in order to provide a liquid of a prescribed composition at a respective holding vessel from which a sample analyzed at the analytical device has been removed; and delivering to that respective holding vessel the amount of each constituent so determined.

11. The process of claim 10 including:

preparing a constituent volley comprising the amount of each constituent of a respective liquid that is required to be added in order to provide a liquid of a prescribed composition at a respective holding vessel from which a sample analyzed at the analytical device has been removed;

delivering the constituent volley to a distribution arrangement at which the constituent volley is routed and delivered to that respective holding vessel.

12. The process of claim 11 wherein the level of the liquid in each respective holding vessel is continuously monitored.

13. The process of claim 12 wherein the operations comprise metalworking operations.

14. The process of claim 13 wherein the liquid of a prescribed composition comprises a coolant that includes a coolant concentrate and water.

15. A liquid supply system operatively associated with an operation and configured to supply to the operation a liquid of a prescribed composition, comprising a plurality of constituents, the liquid of a prescribed composition following its application at the operation, comprising a spent liquid, the liquid supply system including:

a holding vessel operatively associated with the operation and from which the liquid of a prescribed composition is delivered to the operation through a supply line and to which the spent liquid from the operation is returned through a spent liquid line;

an analytical device configured to analyze the composition of the liquid in the holding vessel;

a sampling arrangement operatively associated with the holding vessel and with the analytical device and configured to obtain from the holding vessel and deliver to the analytical device liquid from the holding vessel, the sampling arrangement being separate from both the supply line and the spent liquid line;

a pressure vessel operatively associated with the holding vessel;

a respective constituent supply arrangement operatively associated with a source of each of the plurality of constituents and with the pressure vessel and configured to deliver to the pressure vessel a quantity of constituent required to provide at the holding vessel the liquid of a prescribed composition, whereby a constituent can be delivered to the pressure vessel by each respective constituent supply arrangement to provide a constituent volley at the pressure vessel;

a pneumatic pressuring source operatively associated with the pressure vessel and configured to increase the pressure in the pressure vessel to a selected value while the constituent volley is maintained in the pressure vessel; and a constituent volley delivery arrangement operatively associated with the pressure vessel and the holding vessel and configured to maintain the constituent volley in the pressure vessel while the pressure in the pressure vessel is being increased by the pneumatic pressuring source, release the constituent volley from the pressure vessel when the pressure in the pressure vessel reaches the selected value and deliver the constituent volley to the holding vessel pursuant to the impetus of the selected pressure established in the pressure vessel by the pneumatic pressuring device.

16. The liquid supply system of claim 15 wherein the constituent volley delivery arrangement includes:

a constituent volley conduit system operatively associated with the pressure vessel and the holding vessel and configured to convey the constituent volley to the holding vessel from the pressure vessel; and a pressure control valve operatively associated with the constituent volley conduit system and configured to selectively close the constituent volley conduit system to the conveyance of the constituent volley to the holding vessel from the pressure vessel when the pressure in the pressure vessel is being increased to the selected value and open the constituent volley conduit system to the conveyance of the constituent volley to the holding vessel from the pressure vessel when the selected pressure in the pressure vessel is reached, whereby the constituent volley is delivered to the holding vessel through the constituent volley conduit system.

17. A liquid supply system operatively associated with an operation and configured to supply to the operation a liquid of a prescribed composition, comprising a plurality of constituents, the liquid of a prescribed composition following its application at the operation, comprising a spent liquid, the liquid supply system including:

a holding vessel operatively associated with the operation and from which the liquid of a prescribed composition is delivered to the operation and to which the spent liquid from the operation is returned;

an analytical device configured to analyze the composition of the liquid in the holding vessel:

a sampling arrangement operatively associated with the holding vessel and with the analytical device and configured to obtain from the holding vessel and deliver to the analytical device liquid from the holding vessel;

a pressure vessel operatively associated with the holding vessel;

a respective constituent supply arrangement operatively associated with a source of each of the plurality of constituents and with the pressure vessel and configured to deliver to the pressure vessel a quantity of constituent required to provide at the holding vessel the liquid of a prescribed composition, whereby a constituent can be delivered to the pressure vessel by each respective constituent supply arrangement to provide a constituent volley at the pressure vessel;

a pneumatic pressuring source operatively associated with the pressure vessel and configured to increase the pressure in the pressure vessel to a selected value while the constituent volley is maintained in the pressure vessel; and a constituent volley delivery arrangement operatively associated with the pressure vessel and the holding vessel and configured to maintain the constituent volley in the pressure vessel while the pressure in the pressure vessel is being increased by the pneumatic pressuring source, release the constituent volley from the pressure vessel when the pressure in the pressure vessel reaches the selected value and deliver the constituent volley to the holding vessel pursuant to the impetus of the selected pressure established in the pressure vessel by the pneumatic pressuring device, wherein the liquid supply system is operatively associated with a plurality of operations and the liquid supply system includes:
a respective holding vessel operatively associated with each operation; and
a respective sampling arrangement operatively associated with each respective holding vessel and including a respective sample delivery arrangement and a respective sample routing unit, each respective sample delivery arrangement configured to continuously obtain from the respective holding vessel and deliver to the respective sample routing unit the liquid from the respective holding vessel, and each respective sample routing unit being operatively associated with a respective sample return arrangement and with the analytical device and configured to selectively route to either the respective sample return arrangement or the analytical device liquid delivered to the respective sample routing unit by the respective sample delivery arrangement, wherein
the constituent volley delivery arrangement is operatively associated with each respective holding vessel and includes a distribution arrangement from which the constituent volley from the pressure vessel is delivered to the respective holding vessel for which the constituent volley is intended.

18. The liquid supply system of claim 17 wherein the distribution arrangement includes a respective constituent volley valve located in the constituent volley conduit system.

19. The liquid supply system of claim 17 wherein each respective sample routing unit comprises a respective two-way valve to which the liquid from a respective sample delivery arrangement is delivered, each respective two-way valve having a first exit port and a second exit port that are selectively opened and closed, the first exit port configured when open to be in liquid communication with the analytical device and the second exit port when open configured to be in liquid communication with the sample return arrangement, whereby when the first exit port is open the second exit port is closed, the liquid from the respective sample delivery arrangement delivered to the respective two-way valve is delivered to the analytical device and thereafter to the sample return arrangement through an analytical device discharge line for the return of the liquid to the respective holding vessel from which the liquid has been obtained, and when the second exit port is open the first exit port is closed and the liquid from the respective sample delivery arrangement delivered to the respective two-way valve flows through a respective second exit port discharge line operatively associated with the sample return arrangement for the return of the liquid to the respective holding vessel from which the liquid has been obtained.

20. The liquid supply system of claim 19 wherein each respective sample return arrangement includes a respective liquid return valve that is operatively associated with the analytical device discharge line and a respective liquid return line that is operatively associated with a respective holding vessel, the respective liquid return valve configured to selectively open to the flow of liquid from the analytical device discharge line to the respective liquid return line only when the liquid from the analytical device discharge line comprises liquid removed from the respective holding vessel, and wherein the respective second exit port discharge line is in liquid communication with the respective liquid return line.

21. The liquid supply system of claim 20 wherein each respective sample delivery arrangement includes:
a respective sampling line operatively associated with the liquid in a respective holding vessel and operatively associated with a respective sample routing unit; and
a respective peristaltic pump configured to withdraw liquid from the respective holding vessel and delivering the liquid to the respective sample routing unit through the respective sampling line.

22. The liquid supply system of claim 21 including a respective liquid diffuser located in each respective holding vessel and operatively associated with an open end of a respective sampling line located in the respective holding vessel, whereby liquid enters the open end of the respective sampling line through the diffuser.

23. The liquid supply system of claim 22 including a respective holding vessel liquid level sensor located in each respective holding vessel and configured to determine the level of the liquid in the respective holding vessel.

24. The liquid supply system of claim 23 wherein the constituent volley conduit system is operatively associated with a respective diffuser in a respective holding vessel so as to convey a respective constituent volley from the constituent volley conduit system to the respective holding vessel through the respective diffuser.

25. The liquid supply system of claim 24 wherein the operations comprise metalworking operations.

26. The liquid supply system of claim 25 wherein the liquid of a prescribed composition comprises a coolant that includes a coolant concentrate and water.

27. A liquid supply system operatively associated with a plurality of operations and configured to supply to each operation a respective liquid of a prescribed composition comprising a plurality of constituents, the respective liquid of a prescribed composition, following its application at a respective operation, comprising a respective spent liquid, the liquid supply system including:
a respective holding vessel operatively associated with each respective operation and from which a respective liquid of a prescribed composition is delivered to the respective operation and to which a respective spent liquid from the respective operation is returned;
an analytical device configured to analyze the composition of the liquid in each respective holding vessel;
a respective sampling arrangement operatively associated with each respective holding vessel and with a respective sample return arrangement, both the respective sampling arrangement and the respective sample return arrangement operatively associated with the analytical device, each respective sampling arrangement configured to continuously obtain from a respective holding vessel and selectively route to either a respective sample return arrangement or the analytical device the liquid obtained from a respective holding vessel, and the analytical device configured to deliver to the sample return arrangement liquid routed to the analytical device from the respective sampling arrangement;
a constituent supply arrangement operatively associated with a source of each of the plurality of constituents and configured to provide a selection of one or more constituents comprising the quantity of each constituent required to provide at each respective holding vessel the respective liquid of a prescribed composition;

a constituent delivery arrangement operatively associated with the constituent supply arrangement and with each respective holding vessel and including a distribution arrangement from which a respective selection of one or more constituents is delivered to a respective holding vessel for which the respective selection of one or more constituents is intended.

28. The liquid supply system of claim 27 wherein the respective sampling arrangement includes a respective sample delivery arrangement and a respective sample routing unit the respective sample delivery arrangement configured to continuously obtain from the respective holding vessel and deliver to the respective sample routing unit the liquid from the respective holding vessel, each respective sample routing unit being operatively associated with a respective sample return arrangement and with the analytical device and configured to selectively route to either the respective sample return arrangement or the analytical device liquid delivered to the respective sample routing system by the respective sample delivery arrangement.

29. The liquid supply system of claim 28 wherein the selection of one or more constituents comprises a constituent volley, and the distribution arrangement includes a plurality of constituent volley valves, each constituent volley valve operatively associated with a respective holding vessel through a respective constituent volley conduit system and configured to open when a respective constituent volley is intended for the respective holding vessel with which the constituent volley valve is operatively associated.

30. The liquid supply system of claim 29 wherein each respective sample routing unit comprises a respective two-way valve to which the liquid from a respective sample delivery arrangement is delivered, each respective two-way valve having a first exit port and a second exit port that are selectively opened and closed, the first exit port configured when open to be in liquid communication with the analytical device and the second exit port when open configured to be in liquid communication with the sample return arrangement, whereby when the first exit port is open the second exit port is closed, the liquid from the respective sample delivery arrangement delivered to the respective two-way valve is delivered to the analytical device and thereafter to the sample return arrangement through an analytical device discharge line for the return of the liquid to the respective holding vessel from which the liquid has been removed, and when the second exit port is open the first exit port is closed and the liquid from the respective sample delivery arrangement delivered to the respective two-way valve flows through a respective second exit port discharge line operatively associated with the sample return arrangement for the return of the liquid to the respective holding vessel from which the liquid has been obtained.

31. The liquid supply system of claim 30 wherein each respective sample return arrangement includes a respective liquid return valve that is operatively associated with the analytical device discharge line and a respective liquid return line that is operatively associated with a respective holding vessel, the respective liquid return valve configured to selectively open to the flow of liquid from the analytical device discharge line to the respective liquid return line only when the liquid from the analytical device discharge line comprises liquid removed from the respective holding vessel, and wherein the respective second exit port discharge line is in liquid communication with the respective liquid return line.

32. The liquid supply system of claim 31 wherein each respective sample delivery arrangement includes:
a respective sampling line operatively associated with the liquid in a respective holding vessel and operatively associated with a respective sample routing unit; and
a respective peristaltic pump configured to withdraw liquid from the respective holding vessel and delivering the liquid to the respective sample routing unit through the respective sampling line.

33. The liquid supply system of claim 31 including a respective liquid diffuser located in each respective holding vessel and operatively associated with an open end of a respective sampling line located in the respective holding vessel, whereby liquid enters the open end of the respective sampling line through the diffuser.

34. The liquid supply system of claim 33 including a respective holding vessel liquid level sensor located in each respective holding vessel and configured to determine the level of the liquid in the respective holding vessel.

35. The liquid supply system of claim 34 wherein the constituent volley conduit system is operatively associated with a respective diffuser in a respective holding vessel so as to convey a respective constituent volley from the constituent volley conduit system to the respective holding vessel through the respective diffuser.

36. The liquid supply system of claim 35 wherein the operations comprise metalworking operations.

37. The liquid supply system of claim 36 wherein the liquid of a prescribed composition comprises a coolant that includes a coolant concentrate and water.

* * * * *